United States Patent

Bolitho

[15] 3,638,634
[45] Feb. 1, 1972

[54] BROILER

[72] Inventor: Walter J. Bolitho, 30005 West 13 Mile Road, Farmington, Mich. 48024

[22] Filed: May 28, 1970

[21] Appl. No.: 41,492

[52] U.S. Cl. .................................................. 126/41 R
[51] Int. Cl. ......................................... A47j 37/00, F24c 3/04
[58] Field of Search .......................... 126/41, 25, 25 A, 9

[56] References Cited

UNITED STATES PATENTS

| | | | |
|---|---|---|---|
| 2,898,846 | 8/1959 | Del Francia | 126/41 X |
| 2,362,972 | 11/1944 | Brownback | 126/41 UX |
| 3,474,724 | 10/1969 | Jenn | 126/41 X |
| 3,386,432 | 6/1968 | Hanson | 126/41 |

FOREIGN PATENTS OR APPLICATIONS 217,799 6/1924 Great Britain ........................... 126/41

*Primary Examiner*—Charles J. Myhre
*Attorney*—Russel C. Wells

[57] ABSTRACT

A gas-fired broiler having a compacted volume of trap rock interposed between a grill which supports the edibles and a primary source of heat which cooks the edibles. The trap rock provides both a substantially uniform temperature cooking surface and a noncombustible collector and absorber of liquid animal fats. A member capable of being heated to incandescence is positioned between the primary source of heat and the trap rock pack acting as a distributor of the heat from the burner to the whole area of the trap rock pack.

7 Claims, 7 Drawing Figures

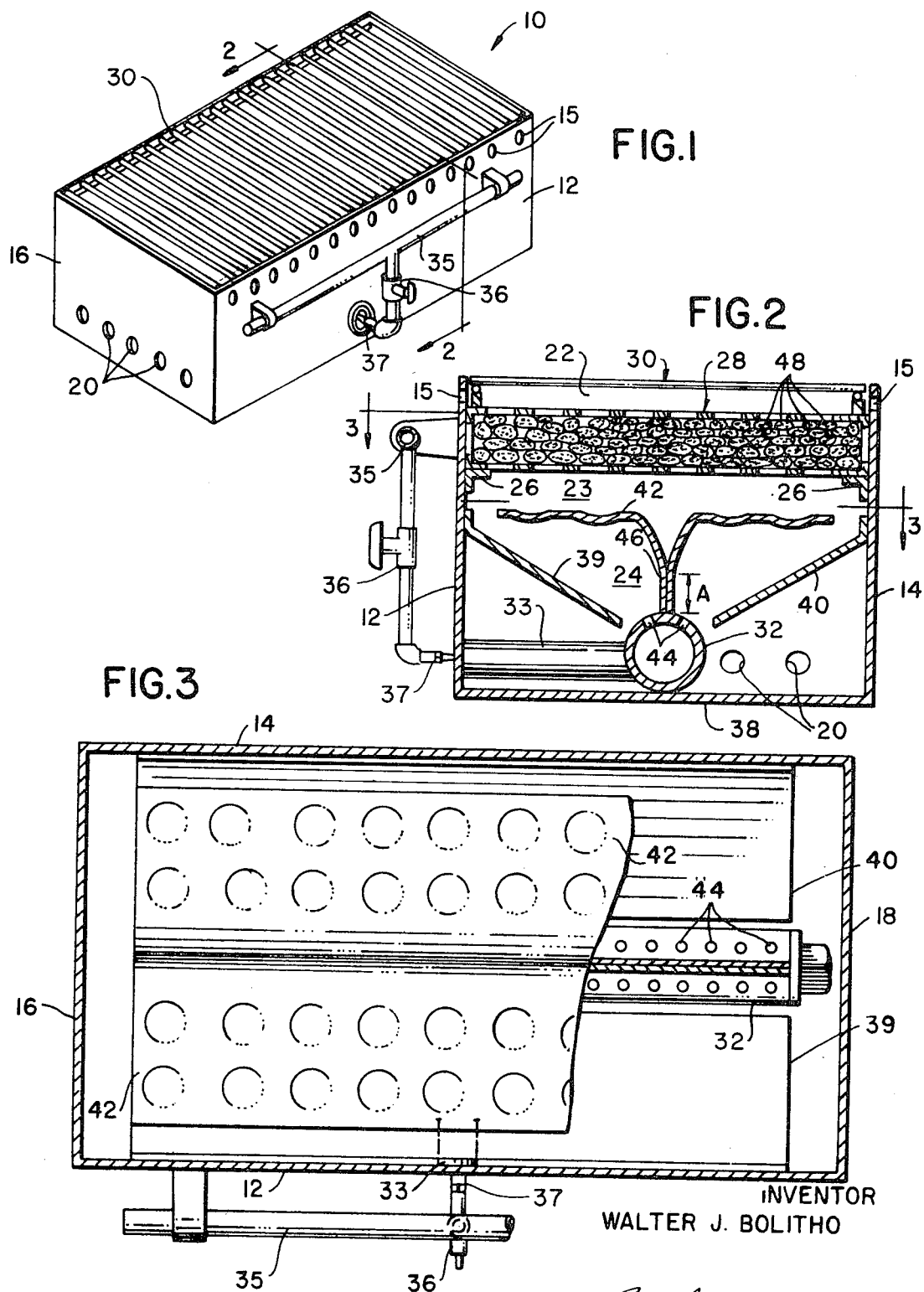

PATENTED FEB 1 1972 3,638,634
SHEET 2 OF 2
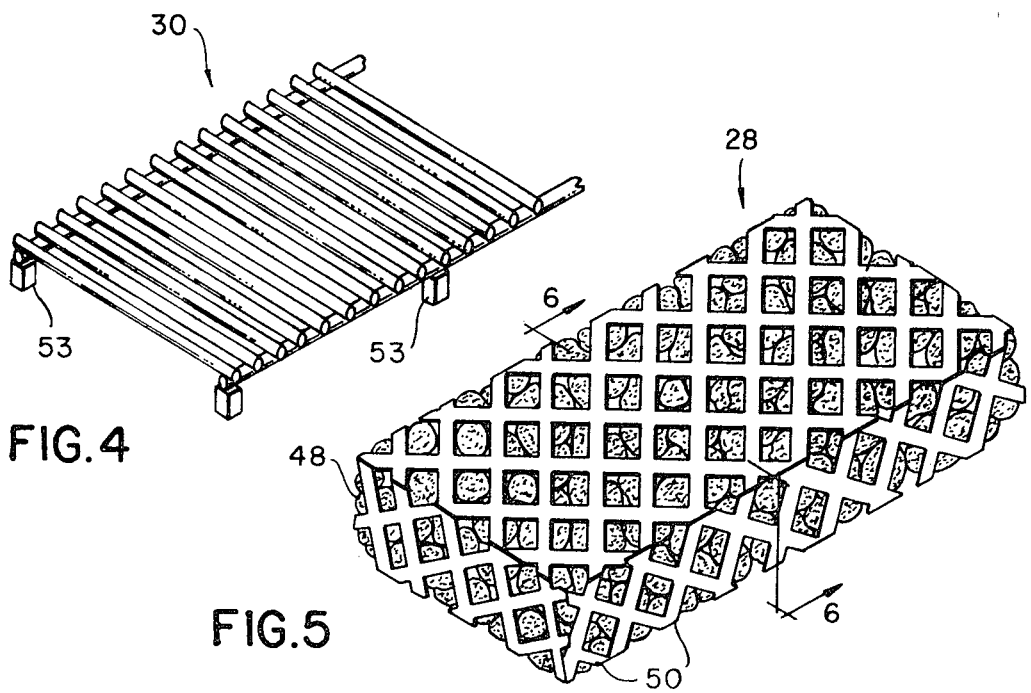
FIG.4
FIG.5
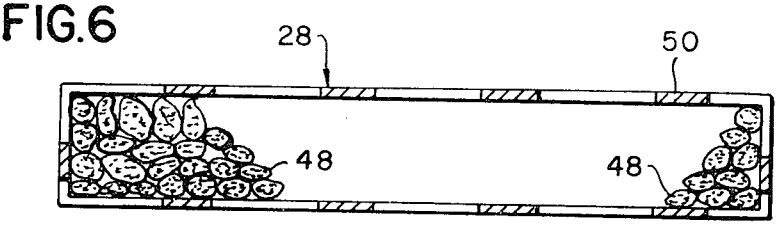
FIG.6
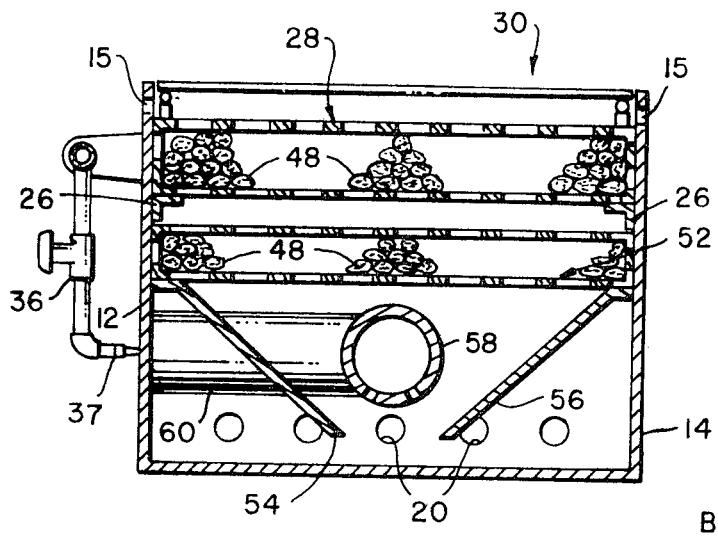
FIG.7
INVENTOR
WALTER J. BOLITHO
BY Russel C. Wells
ATTORNEY 3,638,634

BROILER

FIELD OF INVENTION

This invention relates to gas-fired cooking apparatus in general and more particularly to an improvement in cooking apparatus by means of improved heat distribution to the cooking surface.

PRIOR ART

In the field of barbecuing or broiling over an open fire or any incandescent surface, the surface temperature at the primary source of heat is at a temperature which is high enough to ignite any animal fat or grease, which are basically a form of hydrocarbons, that are allowed to come in contact with the source of heat. The resulting flareup of flame is hazardous to any nearby object and if allowed to continue unchecked, may well burn and ruin the food being prepared. Additionally burning fat or grease usually emit an acrid eye-irritating smoke that is objectionable to anyone in the vicinity.

Generally this flareup results from the solid animal fat being transformed into a liquid grease which is then allowed to drip directly on or into the primary source of heat. Several prior art broilers have attempted to collect this grease by means of troughs terminating at a grease collection receptacle. The cooking grills are positioned on a tiltable member to position the grill in an inclined plane extending toward a trough. The theory being that the fat when it turns to liquid is heavy enough to adhere to the grill and flow along the grill in the direction of the incline and drip into the trough. In this manner, a substantial portion of the grease should not reach the source of heat. The trough then directs the flow of grease, as long as it remains liquid and does not solidify, to a receptacle which may be removed and cleaned after the cooking is complete.

Another prior art device provides a relatively small V-shaped or similar shaped receptacle over the burner ports of a gas-fired burner to prevent any grease from coming in direct contact with the burner.

In order to distribute the heat over a larger surface area from a smaller source of heat such as a gas burner, several broilers provide a loose single layer of refractory or ceramic material either between the grill and the burner or below the burner. This layer is generally very loosely packed and allows the free passage of liquids to the firebox area.

SUMMARY OF INVENTION

It is an object of the invention to provide a substantially uniform heating surface having an area much greater than the area of the burner.

It is another object of the invention to prevent the flow of grease from an edible to the burner thereby preventing a hazardous flareup of flame.

It is another object of the invention to provide a cooking surface which does not become luminous or incandescent.

It is another object of the invention to use the principles of both radiation and convection of heat to provide a uniform temperature cooking surface.

It is still another object of the invention to release in the form of an enveloping light vapor the low-boiling point hydrocarbons contained in the edibles being cooked and retaining the higher boiling point hydrocarbons for delayed disposition by incineration.

In accordance with the above-enumerated objects and other objects as will hereinafter be made clear, there is provided a broiler having a rectangular housing which is opened at the top and internally divided into a grill section and a firebox section. Located within the housing and adjacent to the bottom of the firebox is an atmospheric-type gas burner providing the primary source of heat. Heat dissipation means overlies said burner to distribute the heat from said burner over the whole grill area. A radiating member is interposed in the space between the burner and the heat dissipation means to radiate by conduction and convection a substantially uniform layer of heat across said burner means.

DESCRIPTION OF DRAWINGS

In the drawings:

FIG. 1 is a perspective view of a broiler incorporating the invention;

FIG. 2 is a sectional view taken along line 2—2 of FIG. 1;

FIG. 3 is a sectional plan view of the broiler with certain parts removed;

FIG. 4 is a perspective view of the grill;

FIG. 5 is a perspective view of the rock pack;

FIG. 6 is a sectional view taken along line 6—6 in FIG. 5;

FIG. 7 is a sectional view similar to FIG. 2 showing a modification.

DETAILED DESCRIPTION

Referring to the FIGS. by the characters of reference, there is shown in FIG. 1, a perspective view of a broiler 10 suitable for use with either natural or propane gas. The broiler comprises a rectangular housing or casing having two elongated vertical broadside plates 12 and 14 oppositely disposed and spaced apart from each other. Both plates have a plurality of hot gas relief openings 15 spaced apart near the top of the housing. The ends of the housing are enclosed by a pair of plates 16 and 18 each having a plurality of air inlet openings 20.

The interior of the broiler 10 is divided into a terminal or grill area 22, a secondary area 23, and a primary or firebox area 24. A pair of supporting members 26 mounted on each vertical broadside plate 12 and 14 locate and support a heat dissipation means or rock pack 28, shown in FIG. 5, overlying the secondary area and the firebox area. Overlying and supported by the rock pack 28 is a grill 30, shown in FIG. 4, upon which the edible or food to be broiled is placed.

Located along the bottom of the firebox area 24 and extending substantially the length thereof is a burner 32 which in the preferred embodiment is a gas-fired burner. The burner 32 is positioned parallel to and midway between the opposed vertical broadside plates 12 and 14. The burner is connected to the one vertical broadside plate by a burner venturi tube 33. A pipe manifold comprising an interconnecting pipe 35, a gas valve 36, and an orifice 37, function to convey the fuel source such as gas to the burner venturi tube 33. The orifice 37 and the venturi tube 33 cooperate to provide the proper gas-air mixture for the burner 32 depending on the type of gas being used.

Attached to and extending the entire length of the burner 32 is a radiating or crown member 42 for radiating heat from the burner 32 to the rock pack 28 and for deflecting the products of combustion from the burner to the outer edges of the rock pack. The upper surface of the crown member 42 separates the firebox area 24 from the secondary area 23. The crown member is also a shield for the burner 42 in that it shields the burner from any extraneous matter which might drop from above.

Attached to the interior of the vertical broadside plates 12 and 14 between the support means 26 and the bottom plate 38 and extending at an angle away from the vertical plates are a pair of heat deflection plates 39 and 40 which function to reflect the heat from the bottom of the crown member to guide the flow of heated air toward the secondary area 23. The deflection plates, as a result of this heat reflection from the crown member, creates a pressure differential with the cooler, heavier air pushing the lighter heated air up around the crown member. This results in the bottom plate 38 remaining cooler during the operation of the broiler 10. Also, as will hereinafter be described, these two plates 39 and 40 intercept downward radiating heat and reflect it toward the secondary area.

The housing as previously mentioned, is rectangular in shape and cover means, not shown, may be provided to completely enclose the grill area 22 whenever the broiler is being transported. The pipe manifold may function as a handle means to carry the broiler.

The air inlet openings 20 in each end plate 16 and 18 provide for the entry of the proper amount of secondary combustion air into the firebox area 24. The required primary air enters through the venturi tube 33 and is mixed with the gas in the burner 32. The secondary air is burned with the gas at the ports 44 of the burner. The size and number of the air inlets are a function of the rating of the burner. In one embodiment of the broiler, the burner is rated at 35,000 B.t.u. per hour and the total area of the air inlets 20 is equivalent to 10 1-inch diameter openings. As is well known in the art, the proper amount of air must be provided for efficient and complete burning of a gas-fired burner. Too little air results in incomplete combustion of the gas thereby causing a wasting of the gas. Too much air would unnecessarily cool the rock pack 28 and the air which is heated by the burner and radiated by the crown member 42.

The series of hot gas relief openings 15 near the top of each vertical broadside plate 12 and 14 provide the means for the escape of the hot combustion gases in the unlikely event that the top surface of the grill 30 is completely covered by the food being cooked.

Each end of the interconnecting pipe 35 is threaded so as to provide complete versatility as to which side of the broiler the gas is to be connected. The end opposite the gas inlet, will normally be closed with a threaded plug, however, a gas pressure gage may be attached for checking the gas pressure being supplied to the broiler.

In the preferred embodiment, the burner 32 is an elongated ported burner having two parallel rows of gas ports 44 extending along the upper surface of the burner. As illustrated, the rows are parallel to each other and spaced apart along either side of a vertical plane bisecting the burner 32. It is to be understood that the choice of burner does not depart from the principles of the invention.

Mounted along the burner 32 between the two parallel rows of burner ports 44 and extending away from the burner is the crown member 42. In the preferred embodiment, the crown member is basically Y-shaped wherein the upper arms of the Y have flanges extending away from the body of the Y. The distance across the outside ends of the flanges is approximately 50 to 75 percent of the distance between the vertical broadside plates 12 and 14 of the housing. The short vertical arm 46 of the crown member spaces the upper arms a predetermined distance A from the burner ports 44 to prevent any carbon buildup on the underside of the upper arms due to the gas from the burner ports striking the arms.

The dimpled surface and the Y-shaped construction of the crown member 42 provide structural integrity to the member to prevent deformation when heat is applied. The material for fabricating the Y-shaped crown member 42 must have the capabilities of retaining its shape under the application of heat from the burner and also must not "burn up" or disintegrate from the constant application of cyclic heating and cooling. In the preferred embodiment very light gage stainless steel was selected.

The crown member 42 functions as a radiator during the operation of the broiler. The flame from the burner directly heats the crown member 42 to a state of incandescence from which the rock pack 28 overlying the member is indirectly heated by this substantially uniform heating surface. The heat from the crown member is radiated across the secondary area 23 to the underside of the rock pack and uniformly heats the entire area of the rock pack facing the crown member.

The crown member 42 also functions as a deflector to direct the products of combustion toward the outer ends of the upper arms. These products of combustion are then directed to the outer portions of the rock pack by natural air currents to provide a heating source to this area of the rock pack. In this manner, the rock pack is provided with two sources of heat along its underside which combine to provide a relatively uniform temperature gradient hereacross. This feature is apparent by the end result of broiling food anywhere on the grill to a given degree of being cooked within substantially the same amount of time. At broiling temperatures, the difference in temperature has been less than 50° and closer to 20°. In addition, the crown member deflects any foreign particles which might clog up or close the ports 44 of the burner 32.

The rock pack 28, which in the preferred embodiment comprises a compacted volume of trap rock or lava rock 48. This rock is volcanic in origin having the characteristics of being extremely porous, relatively light in weight as compared to nonvolcanic rock, able to withstand extremely high temperatures without breaking down and also capable of being repeatedly cycled between elevated and ambient temperatures without any destruction. The frame 50 of the rock pack is a perforated metal enclosure as shown in FIG. 5 which in the preferred embodiment is 10 inches square and 1½ inches deep.

The lava rock 48 is crushed or milled to shardlike fragments approximating a size of one-half to three-quarters cubic inch and is compacted into a volume of approximately 50 to 75 percent of its loose volume. The individual fragments of the trap rock 48 mesh with each other to form a pack which is dense enough to prevent a free flow of liquid or grease from the upper surface of the pack to the lower surface while permitting the upward convection of heat from the burner 32 to the grill 30.

The porosity of the rock causes the liquid or grease to collect therein and prevents the grease from reaching the crown member. The irregular shape of the fragments create a multiplicity of air spaces for the upward convection of the heated air. The rock pack 28 retains all of the grease drippings from the food on the grill 30 which may then be cleaned or removed by elevating the temperature of the rock pack above that necessary for broiling. This is usually done upon completion of a barbecuing cycle.

The radiated heat from the crown member and the convected heat from the products of combustion cause the rock pack 28 to become heated but without becoming incandescent or luminous. Therefore, the rock pack does or will not have the capability of initiating or propagating flame, and is thereby a much safer heating source for the grill area 22 upon which the food is placed for broiling or cooking.

The rock pack 28 or packs are placed within the housing in a forcing or binding fit between the vertical broadside plates 12 and 14 and the end plates 16 and 18 of the housing. With this tight fit, all of the products of combustion flow through the rock pack to maintain the desired uniform temperature of the rock pack. If more than one rock pack is used, then the packs abut each other with the same desired forced or binding fit.

A grill 30 is placed directly on top of the upper surface of the rock pack 28 to support the food thereon. Downward depending projections 54 prevent the grill 30 from resting directly on the rock pack 28 thereby forming an open space or terminal area 22 between the bottom of the grill and the top of the rock pack. The top of the rock pack is level with or below the gas relief openings 15. Thereby the products of combustion can be vented laterally in the unlikely event that the complete top surface of the grill is covered with food.

Referring to FIG. 7 there is shown a modification of the radiating member. FIG. 7 is similar to FIG. 2 with the exception that the radiating member is a second rock pack 52 which is identical in construction to the first rock pack 28 except that its cross-sectioned area is substantially less than that of the first rock pack. The heat deflection arms 54 and 56 are also modified to support the second rock pack and the burner 58 is moved closer to the second rock pack 52. This necessitates that the heat deflecting arm 54 has an opening therein for the venturi tube 60 of the burner 58. Since the radiating member is constructed of material such as trap rock, the burner ports are facing downward. In operation the burning gas heats the radiating member to incandescence and the radiating member heats the rock pack 28 as previously mentioned. As illustrated in FIG. 7, the radiating member 52 and the first rock pack 28 are separated by the support means 26 to form an air space therebetween. For ease of construction, the radiating member 52, the support means 26 and the first rock pack 28 may be constructed as an unitary structure supported by the two heat deflection arms 54 and 56 as shown.

OPERATION

In order to operate the broiler 10, a source of gas either natural or propane, is connected to the manifold interconnecting pipe 35 at either end. With the proper orifice cooperating with the venturi, the gas valve 36 is turned on and the burner 32 is ignited. To accelerate the heating of the rock pack 28, the burner 32 may be fired at its highest temperature which is typically much greater than that required for broiling.

After the rock pack 28 has been preheated to a desired temperature, the amount of gas supplied to the burner is reduced to maintain the broiling or cooking temperature of the rock pack. The food is then placed directly on the grill 30 to be cooked.

After the food is prepared, the burner is then fired again at its highest temperature to effect the cleaning of the rock pack and the grill. All of the waste products such as grease are then incinerated and disposed of after which the burner unit may be turned off. The rock pack will cove to ambient temperature within a short period of time so that the unit may be easily handled.

What is claimed is:

1. A gas-fired roller comprising:
   an elongated housing having spaced-apart broadsides and opened along one surface in the direction of its length,
   means exten;ing along said broadsides of said housing, said means dividing said housing into a grill section adjacent said one surface and a firebox section underlying said grill section,
   an atmospheric burner positioned within said firebox and extending in the direction of the length of said firebox for supplying the primary source of heat, said burner having two spaced-apart parallel rows of evenly spaced burner ports,
   heat dissipation means comprising an expanded metal housing enclosing a compacted porous volume of trap rock bodies, said heat dissipation means overlying said burner, and
   an incandescent radiating member interposed in the space between said burner and said heat dissipation means, said radiating member responsive to said burner for incandescently radiating heat to said heat dissipation means and for directing the products of combustion from said burner to said heat dissipation means providing a substantially uniform layer of heat across said heat dissipation means.

2. A gas-fired broiler according to claim 1, wherein said radiating member is operatively connected to said burner means and extends away therefrom toward said heat dissipation means.

3. A gas-fired broiler according to claim 2 wherein said radiating member is a Y-shaped member connected to said burner between said parallel rows of evenly spaced burner ports and the arms of said Y-shaped member extend underlying said heat dissipation means.

4. A gas-fired broiler according to claim 1 wherein said radiating member comprises an expanded metal housing enclosing a compacted porous volume of trap rock bodies capable of being heated to incandescence.

5. A gas-fired broiler according to claim 4 wherein said heat dissipation means and said radiating member form an unitary structure having an air space sandwiched therebetween.

6. A broiler comprising:
   an elongated rectangular housing having spaced-apart broadsides enclosed at each end and opened at the top,
   support means mounted along said broadsides and dividing said housing into a grill section overlying a firebox section,
   an elongated tubular burner extending in the direction of the greatest length of said housing and supported within said firebox section substantially midway between said spaced-apart broadsides, and
   a radiating shield member connected to said burner along a vertical plane bisecting the axis of said burner, said shield extending away from and to either side of said burner in an arc toward each of said broadsides, said member shielding said burner from said grill section and radiating the heat from said burner across said grill section to provide a uniform temperature across said grill section.

7. The broiler according to claim 6 further comprising a heat dissipation means mounted on said support means and extending in said grill section toward said opening in said housing, said heat dissipation means comprising a bed of trap rock bodies capable of being heated by the radiated heat from said radiating shield member and by the convected products of combustion directed from said burner to the outer edges of said bed of trap rock by said radiating shield member.

* * * * *